(12) United States Patent
Machado

(10) Patent No.: US 11,479,402 B2
(45) Date of Patent: Oct. 25, 2022

(54) CONTAINER WITH A MODULAR STRUCTURE

(71) Applicant: Glaucia Machado, Juiz de Fora (BR)

(72) Inventor: Glaucia Machado, Juiz de Fora (BR)

( * ) Notice: Subject to any disclaimer, the term of this patent is extended or adjusted under 35 U.S.C. 154(b) by 275 days.

(21) Appl. No.: 16/612,418

(22) PCT Filed: May 2, 2018

(86) PCT No.: PCT/BR2018/050143
§ 371 (c)(1),
(2) Date: Nov. 11, 2019

(87) PCT Pub. No.: WO2018/209413
PCT Pub. Date: Nov. 22, 2018

(65) Prior Publication Data
US 2020/0062484 A1    Feb. 27, 2020

(30) Foreign Application Priority Data

May 15, 2017   (BR) ...................... 10 2017 010182-7
Apr. 12, 2018   (BR) ...................... 10 2018 007326-5

(51) Int. Cl.
*A46B 11/00*    (2006.01)
*B65D 81/32*    (2006.01)
(Continued)

(52) U.S. Cl.
CPC ....... *B65D 81/3216* (2013.01); *A45D 34/042* (2013.01); *A45D 2034/007* (2013.01); *A45D 2200/05* (2013.01)

(58) Field of Classification Search
CPC .................. A45D 34/042; B65D 81/3216
(Continued)

(56) References Cited

U.S. PATENT DOCUMENTS 2,623,229 A *  12/1952  Brinton ............... A45D 34/02
                                                           401/128
2,904,808 A     9/1959  Massman
(Continued)

FOREIGN PATENT DOCUMENTS

WO    WO 2018/209413    11/2018

OTHER PUBLICATIONS

Relatorio de Pesquisa Internacional e Opiniao Escrita [International Search Report and the Written Opinion] dated Jul. 25, 2018 From the International Searching Authority Re. Application No. PCT/BR2018/050143 and Its Translation of Search Report Into English. (10 Pages).

*Primary Examiner* — Jennifer C Chiang

(57) ABSTRACT

Container with a modular structure consisting of an internal disposable assembly, or refill, comprising a glass vial, preferably intended to contain nail polish formulations, and a brush stem fixed through the glass vial lid, this disposable assembly designed to adapt into an external non-disposable assembly, comprising a lower safe handling base, having a cavity in which the vial is inserted, and a hollow upper body to externally grasp the vial lid to open and close the vial and, at the same time, to grasp the brush stem upper portion, providing appropriate handling of the thus formed brush assembly applicator, reducing the amount of discarded material, encouraging single-person use and safety.

7 Claims, 10 Drawing Sheets

(51) Int. Cl.
*A45D 34/04* (2006.01)
*A45D 34/00* (2006.01)

(58) Field of Classification Search
USPC .......................................................... 401/126
See application file for complete search history.

(56) References Cited

U.S. PATENT DOCUMENTS

| | | | |
|---|---|---|---|
| 3,209,387 A | | 10/1965 | Lukesch |
| 3,311,941 A | | 4/1967 | Buchwalter et al. |
| 5,507,401 A | * | 4/1996 | Huang .................... A45D 34/02 215/12.1 |
| 6,033,143 A | * | 3/2000 | Gueret ................. A45D 34/045 401/126 |
| 6,120,202 A | | 9/2000 | Donsky |
| 8,075,850 B2 | * | 12/2011 | Sangha ..................... B01L 9/00 422/406 |

\* cited by examiner

-AA-

- B B -

-CC-

CONTAINER WITH A MODULAR STRUCTURE

RELATED APPLICATIONS

This application is a National Phase of PCT Patent Application No. PCT/BR2018/050143 having International filing date of May 2, 2018, which claims the benefit of priority Brazilian Patent Application Nos. BR 10 2017 010182-7 filed on May 15, 2017 and BR 10 2018 007326-5 filed on Apr. 12, 2018. The contents of the above applications are all incorporated by reference as if fully set forth herein in their entirety.

FIELD AND BACKGROUND OF THE INVENTION

The present invention is situated in the field of recipients for storage or transport of articles or materials and refers to a container with a modular structure, preferably applied to the storage of nail polish, comprising at least two sets susceptible to association, one internal assembly and one external assembly, the internal assembly being disposable and the external assembly reusable, such that the use of this container stops the need for unnecessarily sharing nail polish, prevents the dissemination of pathogens and reduces wastage from complete disposal of said container.

Today, there are various options of containers available on the market, among which many are destined for the storage of nail polish. Some of these containers are of the disposable type, that is, are used in a single application.

In particular, the disposable containers for storage of nail polish, mostly consist only of reduced size/volume containers. However, it is noteworthy that these containers present handling difficulties by manicures due to the small size.

In addition to the questions about the size of the containers, the format must also be considered. The containers must have a format that allows easy handling during the application, fitting perfectly in the hand of the manicure. Moreover, the format should allow the said container to remain stable on a flat surface, such as a table, avoiding spillage of the liquid stored there.

It must also be emphasized that there should be no need for complete disposal of the container, because the nail polish is packaged only in one portion of said container. Other parts of the container could be reused, further reducing costs.

Moreover, containers must be hygienic, providing safety to the user's health. These should avoid, or at least reduce, chances of contamination during use.

Finally, although the container is disposable, it should be esthetically pleasing, since it should be exposed to the clientele of the manicure, directly affecting the customer's evaluation of the business of this professional.

Accordingly, it appears that the state of the art fails to envisage a container, preferably applied to the storage of nail polish, which has dimensions and formats suitable for manipulation of the manicure or any user, possibility of reuse of at least part of the container to reduce costs and be aesthetically appropriate for the environment in which it will be used.

OBJECTIVES OF THE INVENTION

Therefore, in view of all the above, the objective of the present invention is to disclose a container with a modular structure, preferably applied to the storage of nail polish, wherein part of the structure is reusable and part of the structure is disposable.

It is also an objective of the present invention to disclose a container with a modular structure, preferably applied to the storage of nail polish, that has appropriate dimensions and format for safe handling.

It is also an objective of the present invention to provide a container that reduces or eliminates the chances of contamination during use.

Lastly, it is an objective of the present invention to disclose a container with a modular structure, preferably applied to the storage of nail polish, that is esthetically appropriate.

SUMMARY OF THE INVENTION

Accordingly, with the purpose of achieving the objectives, technical advantages and effects of application reported above, the present invention describes a container with a modular structure comprising at least one internal assembly; at least one external assembly; the internal assembly being susceptible to association with the external assembly; said container with a modular structure defined by the fact that the external assembly comprises at least one base and at least one upper body, the base being susceptible to association with the upper body; the internal assembly comprises at least one vial and at least one lid, the vial being susceptible to association with the lid; the vial comprises at least one means for being removably coupled to the base; the lid comprises at least one means for being removably coupled to the upper body; the vial and the lid being disposable and the base and the upper body being reusable.

The present invention also describes a container with a modular structure wherein the removable coupling means between the vial and the base is defined by two planar flattenings on the vial and two flat faces on the base.

Moreover, the present invention describes a container with a modular structure wherein the removable coupling means between the lid and the upper body is defined by two planar flattenings on the lid and two slanting flat surfaces on the upper body.

There is thus described a container with a modular structure wherein the removable coupling means between the vial and the base restricts the rotation of the vial and removable coupling means between the lid and the upper body restricts the rotation of the lid.

Further, the present invention describes a container with a modular structure wherein the base further comprises at least one receptacle for receiving the vial, at least one region of absence of material and an upper face.

Additionally, the present invention refers to a container with a modular structure wherein the upper body further comprises an internal cavity which comprises at least one conic surface, at least one circular narrowing, at least one intermediary section, at least one cylindrical surface and at least one opening, and the intermediary section defines a gradually-narrowing region.

Moreover, there is described a container with a modular structure wherein at least one stem extends from the lid.

Additionally, there is described a container with a modular structure wherein the stem is susceptible to insertion through the intermediary section to the cylindrical surface which has a smaller diameter than the stem so as to cause restriction of movement by interference between the cylindrical surface and the stem.

There is also described a container with a modular structure wherein the circular narrowing limits the introduction of the lid inside the internal cavity of the upper body.

Moreover, the invention refers to a container with a modular structure wherein at least one application brush extends from the lid.

Lastly, the present invention describes a container with a modular structure wherein the lid comprises an internally threaded cylindrical cavity susceptible to association with the thread of the vial.

BRIEF DESCRIPTION OF THE SEVERAL VIEWS OF THE DRAWINGS

Characteristics, advantages and technical effects of the present invention, as indicated above, will be better understood by a person skilled in the art based on the detailed description ahead, provided solely as exemplary and non-limitative preferred embodiments of the invention, and with reference to the accompanying schematic drawings, wherein.

DESCRIPTION OF SPECIFIC EMBODIMENTS OF THE INVENTION

According to the schematic drawings mentioned above and the examples of possible and preferred embodiments for a container with a modular structure, object of the present invention, the container will now be described in greater detail, but on an exemplary not limitative basis. This is because the present invention may comprise different details, compositions and technical aspects but which do not affect the scope of protection now claimed.

The present invention refers to a container with a modular structure which comprises at least one internal assembly and at least one external assembly, these being associable to each other. Said container wherein the external assembly comprises at least one base (3) and at least one upper body (4), the base (3) being susceptible to association with the upper body (4); and the internal assembly comprises at least one vial (1) and at least one lid (6), the vial (1) being susceptible to association with the lid (6).

In particular, the vial (1) comprises at least one removable coupling means with the base (3). Similarly, the lid (6) also comprises at least one means for being removably coupled to the upper body (4). At this stage it is worth emphasizing that the present invention understands removably coupled to mean any form of encasement that can be done and undone with simple handling of the parts.

In the container with the modular structure proposed herein, the vial (1) and the lid (6) are disposable and the base (3) and the upper body (4) are reusable. In other words, the vial (1) and the lid (6) can be replaced several times, using the same base (3) and the same upper body (4). This fact discloses a core inventive concept of the present invention which is designed to reduce the costs of using these containers.

In a preferred embodiment, in the container with the modular structure of the present invention, the removable coupling means between the vial (1) and the base (3) is defined by two planar flattenings (2*a*, 2*b*) on the vial (1) and two flat faces (14*a*, 14*b*) on the base (3).

In another preferred embodiment, in the container with the modular structure proposed herein, the removable coupling means between the lid (6) and the upper body (4) is defined by two planar flattenings (18*a*, 18*b*) on the lid (6) and two slanting flat surfaces (22*a*, 22*b*) on the upper body (4).

Figure 1:
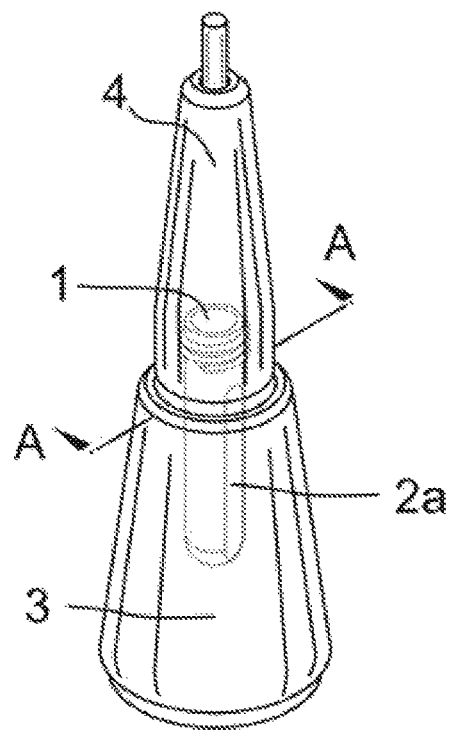
FIG. 1 represents a front perspective view of the container for applying nail polish, with an indication of the position of the vial inside the external assembly, reusable, for protection and handling.

As can be inferred from the accompanying drawings, FIG. 1 presents an illustration of the external assembly with indication of the positioning on the inside of the vial (1), in alignment with the symmetry axis of said assembly, with representation of one of the two planar flattenings (2*a*), these planar flattenings (2*a*, 2*b*) being positioned in diametrally opposite regions of the vial (1).

Figure 2:
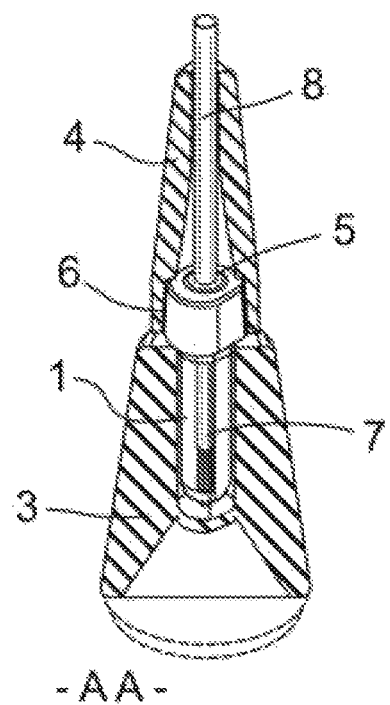
FIG. 2 represents a cross sectional view -AA- in FIG. 1, illustrating the basic components of the assembly of the container containing the single-dose disposable vial.

FIG. 2 illustrates a cross sectional view -AA- in FIG. 1, of the base (3) and of the upper body (4) for handling.

Particular emphasis is place on the isometric view of a disposable assembly (5) comprised by the lid (6), an application brush (7) and a stem (8).

Figure 3A:
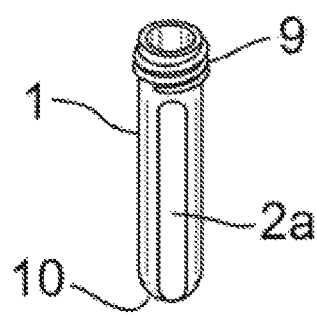
FIGS. 3A and 3B present perspective views of the vial containing nail polish, showing one of the two planar flattenings diametrally opposed on the cylindrical body thereof.

In turn, FIG. 3A illustrates an isometric view of the vial (1) having a preferably cylindrical format, in a view facing one of the two planar flattenings (2a) which give the disposable vial (1) an approximately oval format cross sectional transversal to the symmetry axis, with the aim of preventing the rotation of said vial (1) during application of the opening torque for use thereof.

FIG. 3A also illustrates a thread (9) at the top of the vial (1) and the lower end (10), spherical in format, to hinder the use of said vial (1) without the base (3), for safety reasons.

Figure 3B:
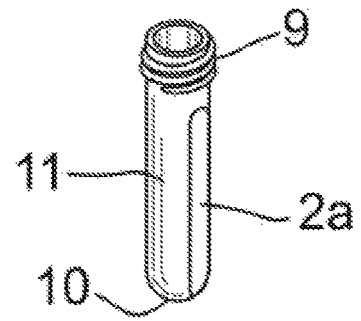

FIG. 3B illustrates a view of the vial (1) rotated so as to show one of the planar flattenings (2a) and one of the faces, essentially cylindrical, the top with thread (9) and the lower end (10) preferably having a spherical format.

Figure 4:
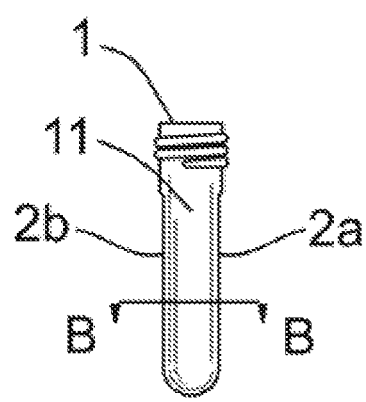
FIG. 4 represents a side view of the vial, perpendicular to the planar flattenings diametrally opposed, showing the profile of the vial, facing one of the cylindrical faces.

FIG. 4 illustrates an isometric view of the vial (1) in a view facing one of the essentially cylindrical faces (11), where it is possible to observe the recoil profile corresponding to the planar flattenings (2a, 2b), diametrally opposed on the cylindrical body of said vial (1).

Figure 5:
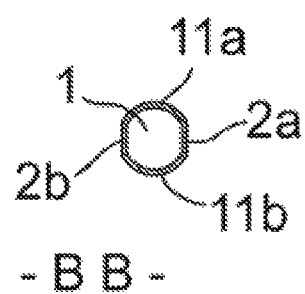
FIG. 5 presents a cross sectional view -BB- in FIG. 4, showing the profile of the planar flattenings diametrally opposed on the essentially cylindrical body of the nail polish vial.

FIG. 5 presents a cross sectional upper view -BB- in FIG. 4, of the wall surrounding the vial (1), essentially oval in format owing to the planar flattenings (2a, 2b), diametrally opposed in relation to the circumference of the essentially cylindrical profile of said vial (1) and of the circular faces (11a) and (11b) diametrally opposed of the essentially cylindrical body of the vial (1).

Figure 6:
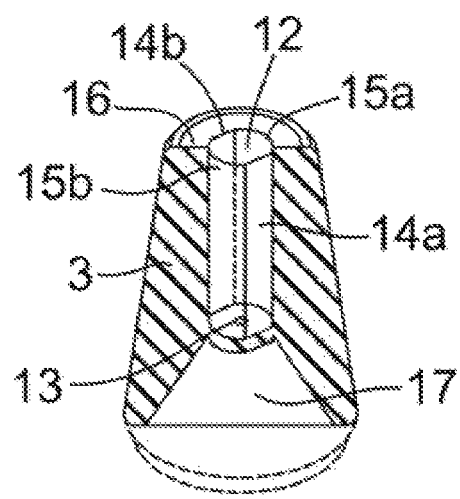
FIG. 6 presents an isometric cutaway view of the body of the base of the assembly, showing the cavity, longitudinal to the symmetry axis, highlighting its format similar to that of the body of the vial with nail polish.

FIG. 6 presents an isometric view cross sectional of the base (3), having an essentially truncated cone format, but may equally be a suitably geometric shape for the chosen market segment. There is illustrated a cavity (12) where the vial (1) is installed, said cavity (12) disposed vertically along the vertical symmetry axis of said base (3), said cavity (12) also having an inner format essentially the same as the format of the outer surface of the vial (1). The format of the cavity (12) and of the vial (1) is to stop the rotation of the vial (1) during its opening for use and to prevent it from being loose in the cavity (12), a minor adjustment attrition being appropriate to keep it firmly in position. Preferably, the cavity (12) has a tubular format.

FIG. 6 also shows that the inner surface of the cavity (12) of the base (3) has two flat faces (14a) and (14b) for contact with the planar flattenings (2a, 2b) of the vial (1) and two cylindrical profile faces (15a) and (15b) for contact with the cylindrical format faces of the vial (1).

The description provided thus far shows a clear advantage of the container proposed herein, in which the planar flattenings (2a, 2b) fit into the two flat faces (14a, 14b), respectively; and this encasement occurs in the insertion of the vial (1) in the cavity (12). The encasement described above causes interference, meaning the vial (1) does not rotate inside the cavity (12), thus enabling the rotation of the lid (6), if so desired by the user and preventing spillage of the content inside said vial (1).

Figure 7:
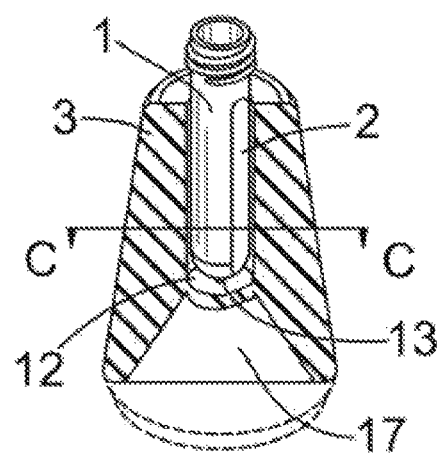
FIG. 7 presents an isometric cutaway view of the body of the base of the assembly, now described, with the vial inserted in the cavity thereof, constituting a functional unit.

FIG. 7 illustrates the cross sectional base (3) similar to that of FIG. 6, to show the positioning of the vial (1) in the cavity (12), of the vial (1) installed in the cavity (12) of the base (3).

Figure 8:
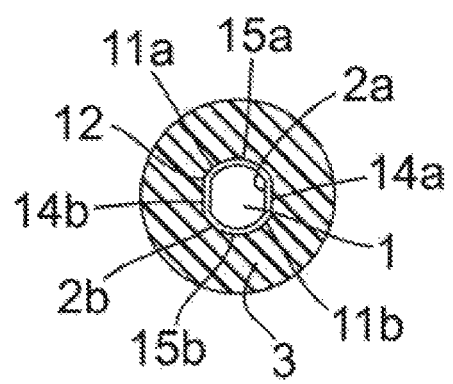
FIG. 8 presents a cross sectional view -CC- in FIG. 7, with the vial inserted in the cavity of the outer protection base and showing the contact of the outer face of the vial and inner face of the cavity of the base.

FIG. 8 presents a cutaway view -cc- of the base (3), with the vial (1) positioned in the cavity (12), where it is possible to see the contact of the outer face of the vial (1) and the internal face of the cavity (12), and the outer surfaces of the vial (1) has the two planar flattenings (2a) and (2b) and cylindrical section faces (11a) and (11b) and the cavity (12), the flat faces (14a,14b) and cylindrical section faces (15a, 15b).

In a preferred embodiment, the base (3) has a region of absence of material (17) at its lower end to reduce the constructive material, which makes the container lighter.

Further, as seen in FIG. 6, the top of the cavity is leveled with the discoid surface (16) of the upper end of the base (3), and said cavity (12) has, at its lower end, an orifice for the circulation of air, to facilitate the insertion, by avoiding internal pressure from any retained air, or withdrawal from the vial (1), containing the nail polish, by avoiding the formulation of vacuum in the cavity (12).

It is worth pointing out here that the vial (1) may have various formats, such as prism, sphere, triangle or any format that provides storage for nail polish. Moreover, it has to be underlined that the inner assembly may comprise more than one vial (1). Consequently, the cavity (12) may also have various formats, provided that it is possible to introduce the vial (1) in the cavity (12).

Preferably, the vial (1) contains up to 2 ml of nail polish, and this volume may vary according to the application of the container.

Figure 9:
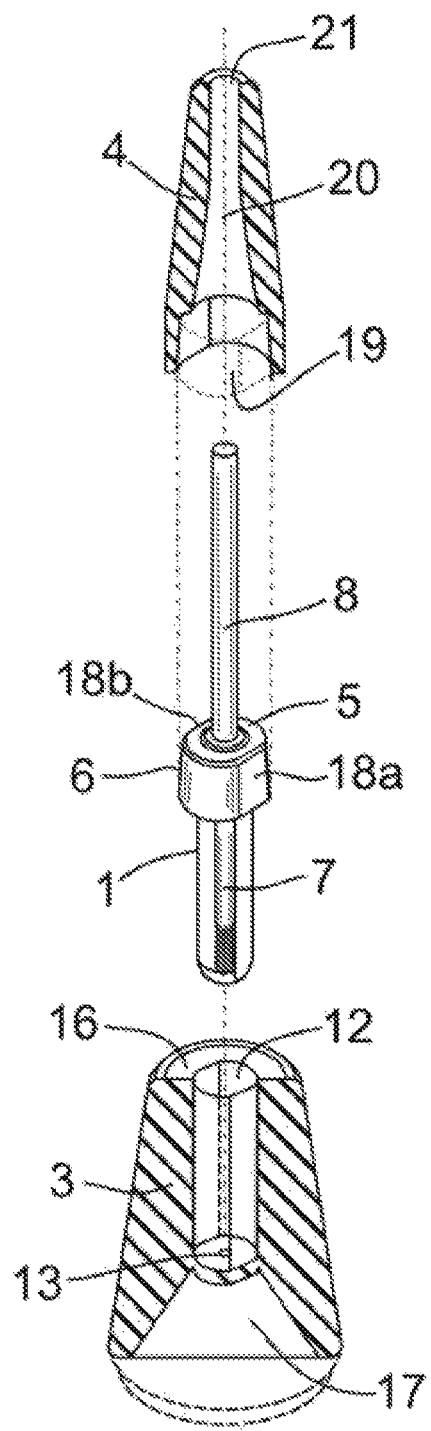
FIG. 9 presents an isometric view of the three elements that make up the assembly of the present container for applying nail polish, showing the outer base and the upper body, reusable, cross sectional, and an external view of the disposable assembly of the vial with nail polish, the application brush and its lid containing the rigid plastic stem perpendicular to its upper face.

In turn, FIG. 9 shows the three basic components of the modular structure container for nail polish, in an isometric view, the base (3) and the upper body (4) for handling shown in cutaway view. The vertical cavity (12), along the symmetry axis of the base (3), leveled at the top on the upper face (16), has at its lower end an orifice for the circulation of air (13), open to the region of absence of material (17). The disposable components of the presente container form a complete set that includes the vial (1), containing the nail polish, and the set (5) that includes the lid (6) and the application brush (7). The stem (8) is perpendicularly fastened to the flat outer face of the lid (6), and both components are preferably made of injected plastic, forming a single part, and said lid (6) has an essentially truncated conic format with diametrally opposed flattenings (18a) and (18b).

FIG. 9 also illustrates the internal structure of the upper body (4) for handling the brush (7), which contains an internal cavity (19), which traverses it. At the lower end, the cavity (19) of the upper body (4). The inner cavity (19) that comprises at least one conic surface (23a), at least one circular narrowing (24), at least one intermediary section (26), at least one cylindrical surface (25) and at least one opening (21), and the intermediary section (26) defines a gradually-narrowing region. The elements described above are positioned along the longitudinal axis (20) of the inner cavity (19).

In a preferred embodiment, in the modular structure container now proposed, the stem (8) is susceptible to insertion through the intermediary section (26) to the cylindrical surface (25) which has a smaller diameter than the stem (8) so as to cause restriction of movement by interference between the cylindrical surface (25) and the stem (8).

Figure 10:
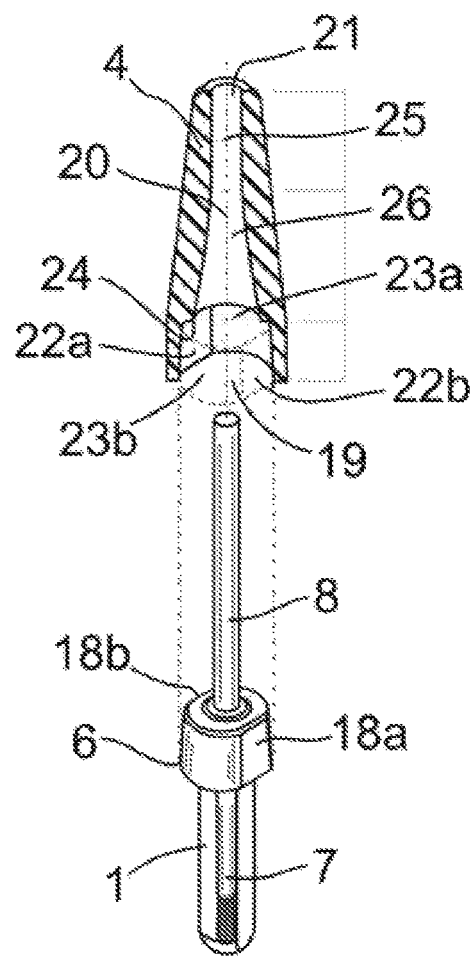
FIG. 10 illustrates details of the upper body for handling the brush with its cavity, the base of which couples to the lid of the vial to open it and withdraw the brush for applying the nail polish, as well as the rigid plastic stem for firm contact with the upper cylindrical section of said longitudinal cavity of the upper body.

FIG. 10 illustrates details of the upper body (4) provided for coupling to the lid (6) which contains the brush (7) for applying the nail polish, acting as an ergometric element for handling same. The lid (6) of the vial (1) has an approximately truncated conic form, containing planar flattenings (18a, 18b) so as to prevent rotated uncoupling between the vial (1) and said lid (6) from being adversely affected when applying torque thereon, by sliding between the outer surface of the lid (6) and inner surface of the inner cavity (19) of the outer body (4), if they are smooth, as in the cylindrical form.

Further in relation to FIG. 10, it is noted that the inner cavity (19) of the upper body (4) has two slanted flat surfaces (22a, 22b), for contact under suitable pressure with the planar flattenings (18a, 18b) of the lid (6), and conic surfaces (23a,23b). The inner cavity (19) for coupling the upper body (4) to the lid (6) has, in its upper part, the circular narrowing (24) for limiting the introduction of the lid (6) only at the height of said cavity (19). The upper portion of the cavity (19) of the upper body (4) has a cylindrical form (25) with a diameter very close to the outer diameter of the stem (8) for encasement, with sufficient attrition, to provide additional firmness to the coupling of the set (5) of the lid (6) and brush (7) for applying the nail polish, to said upper body (4). Between the inner cavity (19) and the upper cylindrical section (25), the cavity (19) of the upper body (4) has an intermediary section with an approximately pseudospherical form (26) having the function of acting as sliding guide for the end of the stem (8) towards the upper cylindrical section (25), when performing the operation of coupling the upper body (4) to the lid (6) with the pincel (7) for applying the nail polish for use.

Figures 11A, 11B:
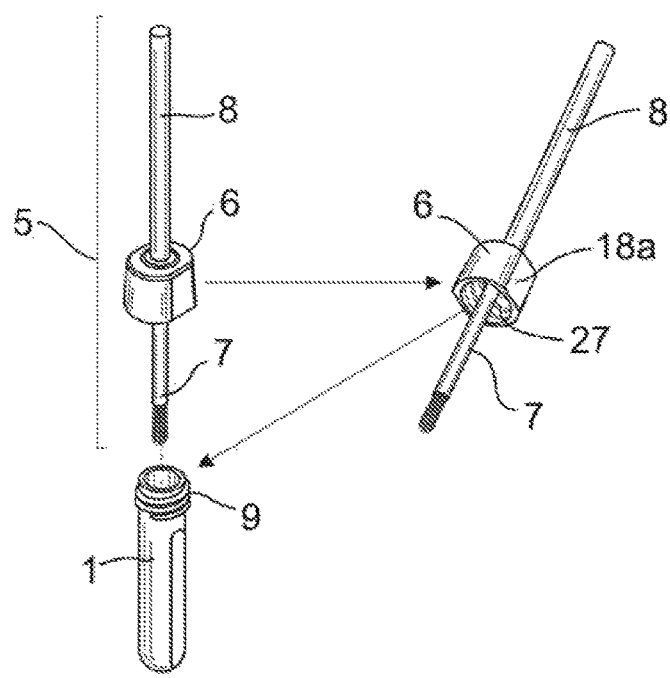
FIGS. 11A and 11B present details of the assembly of the lid of the vial with nail polish and its components.

FIG. 11A illustrates the assembly of the lid (6) of the vial (1) that contains the brush (7) for applying the nail polish on its lower inner face and, perpendicularly to the upper face of its flat surface, the stem (8) for additional coupling to the upper body (4), and FIG. 11B shows that the lid (6) of the vial (1) has a cylindrical cavity (27), internally threaded, for encasement into the upper end of the vial (1) through the corresponding thread (9) for closing and opening same.

Figures 12A, 12B:
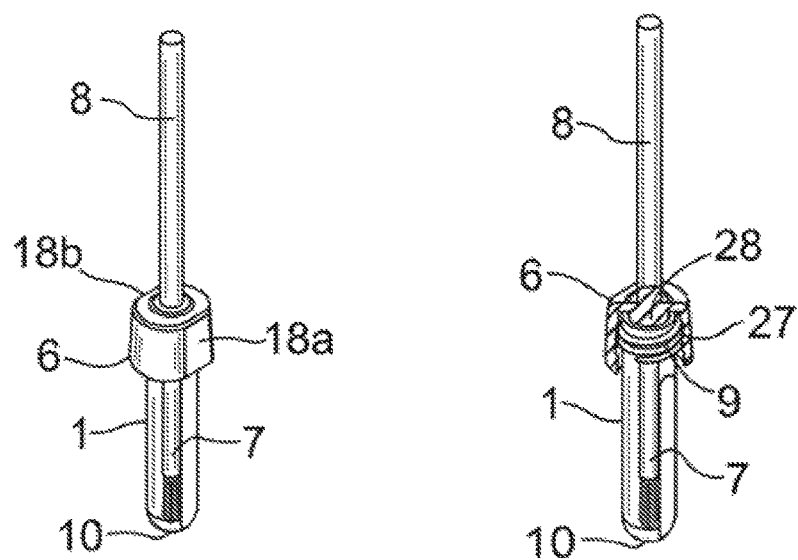
FIGS. 12A and 12B present an isometric view of the disposable assembly of the vial, lid and application brush of the nail polish and highlights the encasement, by thread, of the assembly of the lid at the top of the vial with nail polish.

FIG. 12A illustrates the disposable assembly of the present nail polish container which includes the vial (1) containing the nail polish in a single dose and the lid (6), with the brush (7) on its lower face, and the stem (8) on its upper face, whereas in FIG. 12B the same assembly is shown with the lid (6) in cutaway view for visualizing the encasement of the inner thread of its cylindrical cavity (27) into the outer thread (9) of the vial (1) and the sealing body (28) of the vial (1), coupled to the upper end of the body of the brush (7) for applying the nail polish.

Figure 13:
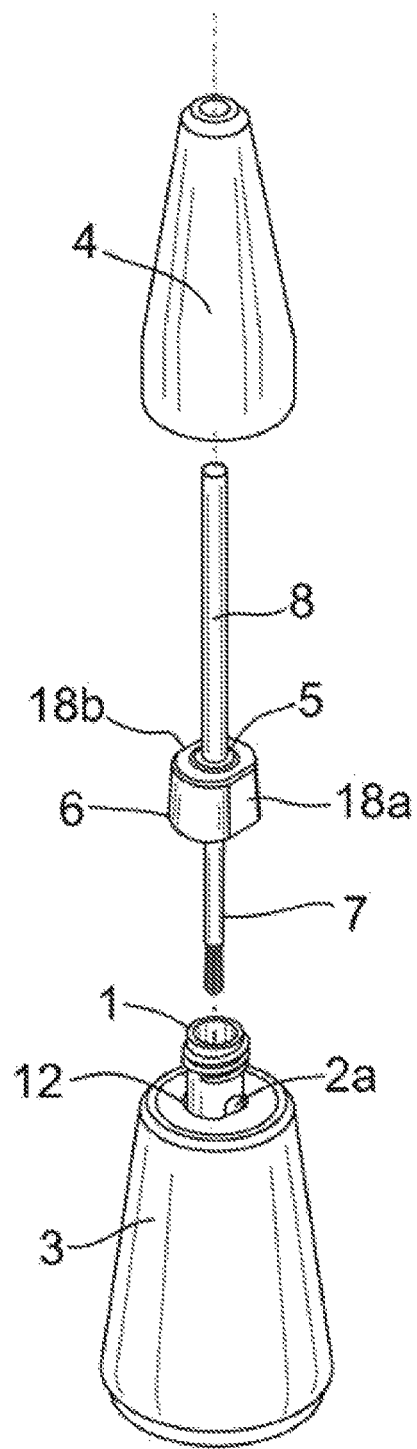
FIG. 13 presents the components of the complete assembly of the present container, in an external isometric view.

FIG. 13 illustrates an isometric view of the outer arrangement of the three basic components of the presente container for nail polish, with the vial (1) installed in the cavity (12) of the base (3), showing one of the planar flattenings (2a) of the vial (1) to prevent the rotation of same during application of torque to open the lid (6), the assembly (5) of the lid (6) containing the brush (7) fastened on its inner face and, perpendicularly on its upper outer face, the stem (8) for additional fastening to the upper body (4), after uncoupling the lid (6) from the vial (1) containing the nail polish, and said lid (6) contains the slanted flat sections on the outer surface (18a, 18b) to prevent rotational sliding between the lid (6) and the upper body (4) after encasement for opening the vial (1).

Figure 14:
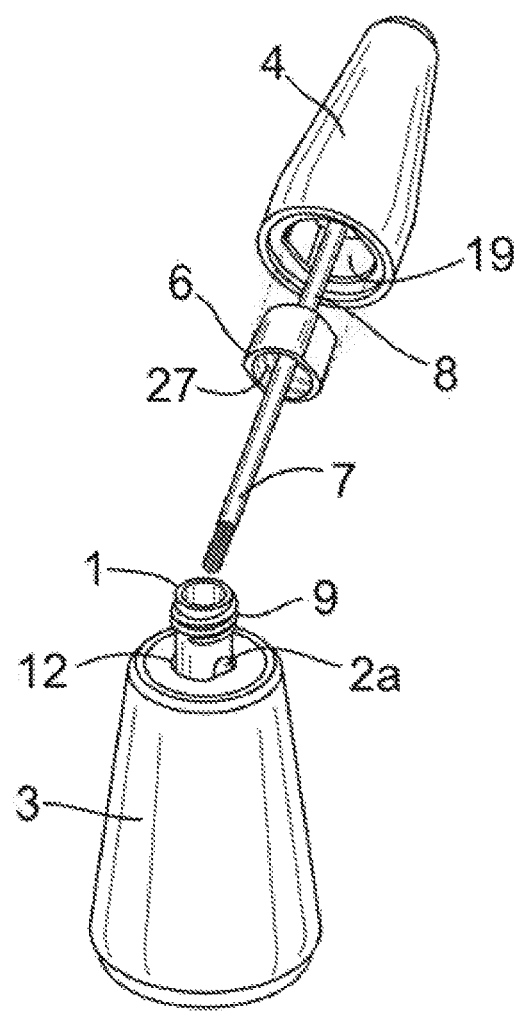
FIG. 14 illustrates the relationship of encasement of the handling upper body to the outer surface of the lid of the vial with nail polish.

FIG. 14 illustrates the relationship for coupling the lid (6), containing the brush (7) for applying the nail polish and the rigid stem (8), to the inner cavity (19) of the upper body (4), with the assistance of the upper section of the stem (8), which fastens to the inside of the upper body (4) for additional fastening, when it is desirable to withdraw, for use, the brush (7) from inside the vial (1) installed in the cavity (12) of the base (3).

Figure 15:
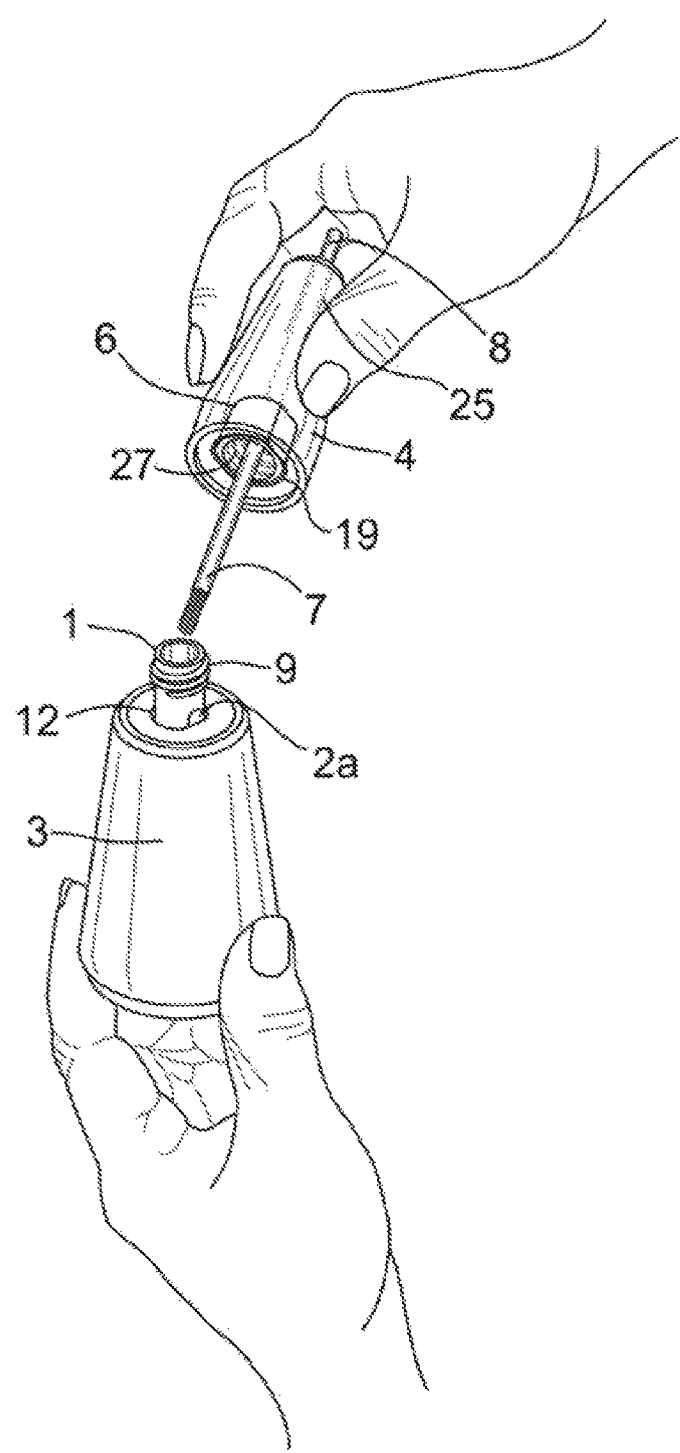
FIG. 15 illustrates the assembly set for use, with the lid of the vial, containing the application brush of the nail polish, already coupled to the internal cavity of the handling upper body.

FIG. 15 illustrates the assembly in the use arrangement, with the vial (1) open and kept in the cavity (12) of the vial (1) and the lid (6), containing the brush (7) for applying the nail polish, already coupled to the internal cavity (19) of the upper body (4) for handling the brush (7), ready for use, after uncoupling the threaded cylindrical cavity (27) of the lid (6) from the thread (9) of the vial (1), and the firm contact of the upper end of the stem (8) with the cylindrical upper tubular section (25) of the upper body (4) provides additional firmness to the assembly during use, after successive changes of the disposable assembly formed by the vial (1), lid (6) and brush (7), since the base (3) and the upper body (4) are reusable.

It is worth pointing out that the sole purpose of the above text is to describe examples of preferred embodiments of the fertilizer composition and its production process, according to the present invention. Therefore, it should be clarified that for persons skilled in the art there are countless possible modifications, variations and combinations within the scope of protection defined by the accompanying claims.

What is claimed is:

1. A container with modular structure comprising:
   an internal disposable assembly consisting of a glass vial intended to contain, preferably, nail polish formulations, having a threaded circular upper end and a pair of planar flattening diametrically opposed on the cylindrical body of said vial; and
   a vial lid having an inner threaded circular cylindrical cavity and an outer surface having a pair of diametrically opposed planar flattening, attached to a brush fastened to a flat end inner face of said vial lid, and a stem upper section perpendicularly fastened on a flat end outer face of said vial lid, said stem upper section intended to provide additional coupling to a reusable upper body, thus forming the complete brush assembly for use; and
   an external reusable assembly consisting of
   a reusable lower safe handling base, having a cylindrical cavity having a pair of diametrically opposed planar flattening, forming a receiving cavity to accommodate said glass vial; and
   a reusable upper body having a traversing cavity, wherein a lower end section of said traversing cavity has a pair of diametrically opposed planar flattening, to externally provide coupling of said reusable upper body with said glass vial lid, to open and close said glass vial, and an upper, hollow cylindrical section to, at the same time, provide additional coupling of said reusable upper body with said stem upper section, providing firmness to the brush assembly for same for appropriate handling.

2. The container of claim 1, wherein said glass vial has an approximately oval cylindrical body, formed with two diametral opposed planar flattening, to adapt into the receiving cavity of said reusable handling base, said vial diametrically opposite planar flattening intended to contact flat faces of the planar flattening of the receiving cavity for coupling, the upper end of said vial having a corresponding thread and a preferred spherical bottom to prevent the use of said disposable assembly without said reusable handling base.

3. The container of claim 1, wherein said vial lid has a circular cylindrical cavity, internally threaded for encasement with the upper threaded end of said glass vial, and an external surface having a pair of diametrically opposed planar flattening to provide a coupling with a lower end section of the traversing cavity of said reusable upper body, a brush internally fastened to the flat end inner surface of said vial lid and a stem upper section perpendicularly fastened on the flat end outer surface of said vial lid, said stem upper section having a diameter very close to the inner diameter of the upper hollow cylindrical section of said reusable upper body, for encasement with sufficient attrition, to provide additional firmness for appropriate handling of the thus formed brush assembly.

4. The container of claim 1, wherein the receiving cavity of said reusable handling base has and inner format essentially the same as the format of the outer surface of said glass vial, to provide a contact coupling of said vial inside said reusable lower handling base, to prevent rotation of said glass vial when torque is applied on said glass vial lid to open or close said vial when in use.

5. The container of claim 1, wherein the receiving cavity of said reusable handling base has an orifice at a lower end thereof, to allow air circulation to facilitate the insertion of said glass vial, by avoiding internal pressure from any retained air, or withdrawal of the vial by avoiding formation of vacuum into said receiving cavity.

6. The container of claim 1, wherein a lower end section of the traversing cavity of said reusable upper body has a pair of diametrically opposed internal planar flattening to form a removable coupling with the outer surface of said vial lid, which also has two planar flattening, to allow the required application of torque to open and close said glass vial, the lower end section of said traversing cavity having a circular narrowing for limiting the introduction of said vial lid only to the height of said lower end section of the traversing cavity.

7. The container of claim 1, wherein the traversing cavity of said reusable upper body has an intermediary section, with an approximately pseudospherical form, and an upper circular cylindrical or tubular section, having an internal diameter very close to the outer diameter of said stem upper section, fastened to the outer flat end surface of said vial lid, for encasement with sufficient attrition, to provide additional firmness to the coupling of the reusable upper body with the set formed by said vial lid and brush, providing appropriate handling of the thus formed brush assembly, as well as the required detachment of said reusable upper body from the vial lid and the stem upper section, when replacing the internal disposable assembly, reducing the amount of discarded material.

* * * * *